US008024224B2

(12) United States Patent
Faber et al.

(10) Patent No.: US 8,024,224 B2
(45) Date of Patent: Sep. 20, 2011

(54) METHOD AND APPARATUS TO PROVIDE PAY-PER-CALL ADVERTISING AND BILLING

(75) Inventors: Scott Faber, San Francisco, CA (US); Marc Barach, Oakland, CA (US); John Somorjai, San Mateo, CA (US); Henrik Axel Ebbe Altberg, Mill Valley, CA (US); Michael Fordyce, San Francisco, CA (US); Chris Hickson, East Palo Alto, CA (US); Ron Hirson, San Francisco, CA (US); Sean David Van der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 1573 days.

(21) Appl. No.: 10/872,117

(22) Filed: Jun. 17, 2004

(65) Prior Publication Data
US 2005/0203799 A1    Sep. 15, 2005

Related U.S. Application Data

(60) Provisional application No. 60/552,124, filed on Mar. 10, 2004.

(51) Int. Cl.
*G06Q 30/00* (2006.01)
*G05B 19/418* (2006.01)
(52) U.S. Cl. ............... 705/14.73; 707/705; 707/607; 370/389
(58) Field of Classification Search .............. 705/14; 707/705, 607; 370/389
See application file for complete search history.

(56) References Cited

U.S. PATENT DOCUMENTS

| 4,313,035 A | 1/1982 | Jordan et al. |
| 4,577,065 A | 3/1986 | Frey et al. |
| 4,631,428 A | 12/1986 | Grimes |
| 4,645,873 A | 2/1987 | Chomet |
| 4,653,090 A | 3/1987 | Hayden |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,788,718 A | 11/1988 | McNabb et al. |
| 4,847,890 A | 7/1989 | Solomon et al. |
| 5,058,152 A | 10/1991 | Solomon et al. |
| 5,148,474 A | 9/1992 | Haralambopoulos et al. |
| 5,319,542 A | 6/1994 | King, Jr. et al. |

(Continued)

FOREIGN PATENT DOCUMENTS
AU           699 785           5/1995
(Continued)

OTHER PUBLICATIONS

"DHTML for the World Wide Web". Jason Cranford.1998. Peachpit Press.pp. 150 and 151.*

(Continued)

*Primary Examiner* — John G. Weiss
*Assistant Examiner* — Victoria Vanderhorst
(74) *Attorney, Agent, or Firm* — Greenberg Traurig, LLP

(57) ABSTRACT

In one embodiment, the invention provides a method for pay-per-call advertising and billing. A method, comprises generating a web page listing a plurality of merchant entries; and providing a option to reveal a phone number of at least one merchant entry of the plurality of merchant entries.

20 Claims, 5 Drawing Sheets

U.S. PATENT DOCUMENTS

| | | |
|---|---|---|
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,793,851 A | 8/1998 | Albertson |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,077 A | 5/1999 | Harashima |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d'Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky et al. |
| 6,269,336 B1 | 7/2001 | Ladd et al. |
| 6,269,361 B1 | 7/2001 | Davis et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,418,214 B1 | 7/2002 | Smythe et al. |
| 6,430,276 B1 | 8/2002 | Bouvier et al. |
| 6,434,527 B1 | 8/2002 | Horvitz |
| 6,438,216 B1 * | 8/2002 | Aktas ........................ 379/88.01 |
| 6,460,036 B1 | 10/2002 | Herz |
| 6,463,136 B1 | 10/2002 | Malik |
| 6,470,079 B1 | 10/2002 | Benson |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,523,010 B2 | 2/2003 | Lauffer |
| 6,523,101 B1 | 2/2003 | Nakata |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,570,870 B1 | 5/2003 | Berstis |

| | | | |
|---|---|---|---|
| 6,606,376 B1 | 8/2003 | Trell | |
| 6,625,595 B1 | 9/2003 | Anderson et al. | |
| 6,636,590 B1 | 10/2003 | Jacob et al. | |
| 6,658,389 B1 | 12/2003 | Alpdemir | |
| 6,757,364 B2 | 6/2004 | Newkirk | |
| 6,836,225 B2 | 12/2004 | Lee et al. | |
| 6,968,174 B1 | 11/2005 | Trandal et al. | |
| 7,065,500 B2 * | 6/2006 | Singh et al. | 705/26 |
| 7,428,497 B2 | 9/2008 | Agarwal et al. | |
| 2001/0048737 A1 | 12/2001 | Goldberg et al. | |
| 2002/0003867 A1 | 1/2002 | Rothschild et al. | |
| 2002/0029241 A1 | 3/2002 | Yokono et al. | |
| 2002/0065959 A1 | 5/2002 | Kim et al. | |
| 2002/0087565 A1 | 7/2002 | Hoekman et al. | |
| 2002/0095331 A1 | 7/2002 | Osman et al. | |
| 2002/0120554 A1 | 8/2002 | Vega | |
| 2002/0133570 A1 | 9/2002 | Michel | |
| 2002/0133571 A1 | 9/2002 | Jacob et al. | |
| 2002/0141404 A1 * | 10/2002 | Wengrovitz | 370/389 |
| 2002/0156815 A1 * | 10/2002 | Davia | 707/517 |
| 2002/0173319 A1 | 11/2002 | Fostick | |
| 2002/0191762 A1 | 12/2002 | Benson | |
| 2002/0193094 A1 | 12/2002 | Lawless et al. | |
| 2003/0043981 A1 | 3/2003 | Lurie et al. | |
| 2003/0046161 A1 | 3/2003 | Kamangar et al. | |
| 2003/0220866 A1 | 11/2003 | Pisaris-Henderson | |
| 2004/0096110 A1 | 5/2004 | Yogeshwar et al. | |
| 2004/0103024 A1 | 5/2004 | Patel et al. | |
| 2004/0162757 A1 | 8/2004 | Pisaris-Henderson | |
| 2004/0204997 A1 | 10/2004 | Blaser et al. | |
| 2004/0234049 A1 | 11/2004 | Melideo | |
| 2004/0234064 A1 | 11/2004 | Melideo | |
| 2004/0236441 A1 | 11/2004 | Melideo | |
| 2004/0254859 A1 | 12/2004 | Aslanian, Jr. | |
| 2004/0258048 A1 | 12/2004 | Melideo | |
| 2004/0260413 A1 | 12/2004 | Melideo | |
| 2005/0010795 A1 | 1/2005 | Tagawa et al. | |
| 2005/0021744 A1 | 1/2005 | Haitsuka et al. | |
| 2005/0048961 A1 | 3/2005 | Ribaudo et al. | |
| 2005/0065811 A1 | 3/2005 | Chu et al. | |
| 2005/0080878 A1 | 4/2005 | Cunningham et al. | |
| 2005/0096980 A1 * | 5/2005 | Koningstein | 705/14 |
| 2005/0114208 A1 | 5/2005 | Arbuckle et al. | |
| 2005/0203799 A1 | 9/2005 | Faber et al. | |
| 2005/0209874 A1 | 9/2005 | Rossini | |
| 2005/0220289 A1 | 10/2005 | Reding et al. | |
| 2006/0069610 A1 | 3/2006 | Rossini | |

FOREIGN PATENT DOCUMENTS

| | | |
|---|---|---|
| GB | 2 329 046 A | 3/1999 |
| JP | 409233441 A | 9/1997 |
| JP | 409319812 A | 12/1997 |
| KR | 20010086595 | 9/2001 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |

OTHER PUBLICATIONS

Verizon transforms local search with Launch of New SuperPages.com Web site. Mar. 1, 2004. Newswire.*
American Online Launches New Yellow pages 'Bot' to Make American Online Yellow Pages more convenient and accessible than ever. Jun. 26, 2003. Newswire.*
"USA Global Link Brings Interactively to Internet Shopping," Business Wire (Oct. 1998).
"Lucent Technology and Netscape Team to Deliver Lucent Ecommerce Solutions," Business Wire (Sep. 1998).
"TriNet's 'Help M, I'm Stuck' Internet Voice Button Service Pushes Web Pages to Online Users," Business Wire (Sep. 1998).
Rich Tehrani, "e-Rip Van Winkle and the 60-Second Nap," Call Center Solution, vol. 18, No. 2, pp. 16(3) (Mar. 1998).
"NetCall Internet Call-Buttons Enhance E-Commerce Customer Service and Sales," PR Newswire, 7431 (Aug. 1999).
"Connecting to On-Line Car Shoppers: Auto Sellers Use NetCall Internet Call-Button Technology to Turn 'Clicks' into Interactive Sales," PR Newswire, p. 4089 (Jul. 1999).
Ellen Greenblatt "Have you ever wondered . . . ," Datamation, p. 126 (Oct. 1997).
Kiyoski Kabeya et al., "A New Teleconsultation Terminal System Using ISDN," NTT Review, pp. 37-43 (Jul. 1991).
Tom Davey, "Wheeling and Dealing Online," PC Week, vol. 13, No. 45, pp. 1 and 129 (Nov. 1996).
Stacy Collett and Julia King, "Why Online Browsers Don't Become Buyers," Computer World, vol. 33, No. 48, p. 14 (Nov. 1999).
Information about Expertcity.com retrieved from the Internet [http://www.expertcity.com] on Nov. 6, 2000.
Gregory Dalton, "Rent-An-Expert on the Web," Information Week, p. 75 (Sep. 6, 1999).
"Expertcity.com Launches Premier Online Marketplace for Expert Services," PR Newswire (Aug. 1999).
Information about Keen.com retrieved from the Internet [URL:http://www.keen.com] on Oct. 24, 2000, disclosure dates back to 1999.
Chris Ott, "Making Good on the Information Economy," Denver Business Journal (Dec. 17, 1999).
Michael Rogers, et al., "Experts Abound at New Web Sites," Library Journal, pp. 22-24 (Mar. 1, 2000).
"SurfBrains.com: Brains Online Save Time & Money," MS Presswire (Jul. 11, 2000).
Cynthia Hodgson, "Online Expert Databases & Services," Econtent, pp. 48-53 (Dec. 1999).
Michael Kanellos, "Do You Want to Know the Meaning of Life?," Computer Reseller News, pp. 73-74 (Mar. 3, 1997).
"Applying Technology News," Accounting Technology, p. 14 (Feb./Mar. 1997).
Joann M. Wasik, "Information for Sale: Commercial Digital Reference and AskA Services," Virtual Reference Desk, [http://www.vrd.org/AskA/commAskA.html] (Sep. 20, 1999) .
EXP.com web-site at www.exp.com.
The web-site at www.experts-exchange.com.
Welcome to the Electronic Emissary Project's WebCenter at www.tapr.org/emissary.
The web-site at www.allexperts.com.
Richard A Kuehn, "The Voice of Technology," Credit World, pp. 20-23 (Jul. 1994).
Jeff Pelline, "Net Firm to Connect Users by Phone," CNET News.com [retrieved from http://new.cnet.com] (Oct. 24, 2000).
"Keen.com Launches First Live Answer Community," Press Release [retrieved from http://www.keen.com] (Oct. 24, 2000).
Jon Healey, "From A to Z, You Can Sell Advice Online," Mercury New [retrieved from http://www.O.mercurycenter.com] (Oct. 24, 2000).
Joseph Menn, "An Expert? There's Now a Home for Your on the Internet," Los Angeles Times [retrieved from http://www.denverpost.com] on Oct. 24, 2000.
"Walker Digitial Issued Landmark U.S. Patent No. 5,862,223 for Global Internet Marketplace for Experts," Business Wire (Jan. 26, 1999).
Qcircuit Web Site (www.qcircuit.com).
Infomarkets.com Web Site (www.infomarkets.com).
Intellect Exchange Web Site (www.intellectexchange.com).
Answers.com Web Page (www.answers.com).
Amir Herzberg, et al., "MiniPay: Charging Per Click on the Web," Computer Networks and ISDN Systems 29, (Sep. 1997) vol. 29, pp. 939-951.
Mary Wagner, "Caring for Customer. (Internet/Web/Online Information)—Real-time text chat and telephony provide personalized customer support and turn queries into sales leads," Internet World, Sep. 1, 1999, (3 pgs.).
Masahiko Hase, et al., "Advanced Videophone System Using Synchronized Video Filing Equipment," NTT Review, vol. 3, No. 4, pp. 29-36 (Jul. 1991).
Franco Mercalli, et al., "TheESSAI Teleshopping System: An Example of a Broadband Multimedia Application," Publication No. 0-7803-1820-X/94, IEEE, pp. 572-576 (1994).
Abhaya Asthana, et al., "A Small Domain Communications System for Personalized Shopping Assistance," Proceedings of ICPWC '94, Publication No. 0-7803-1996-6/94, IEEE, pp. 199-203 (1994).

Linda Littleton, HDD: A Helpdesk Database "Meet the Shadowy Future," Proceedings ACM SIGUCCS User Services Conference XXII, Ypsilanti, Michigan, pp. 205-210 (Oct. 16-19, 1994).

L.F. Ludwig, et al., "Laboratory for Emulation and Study of Integrated and Coordinated Media Communication," Conference on Office Information Systems, Sponsored by ACM SIGOIS and IEEECS TC-OA in cooperation with IFIP W.G. 8.4, pp. 283-291 (Mar. 23-25, 1988).

*Keen.com, Inc.* v. *InfoRocket.com, Inc.*, Preliminary Injunction Hearing, pp. 286-289 (Jan. 8, 2002).

*Keen.com, Inc.* v. *InfoRocket.com, Inc.*, Complaint for Patent Infringement, Trade Dress Infringement and Unfair Competition; Demand for Jury Trial filed Aug. 31, 2001, pp. 1-8 plus 17 pgs. Of attachments.

E.J. Addeo, et al., "An Experimental Multi-Media Bridging System," Frontiers in Computer Communications Technology, Computer Communications Review, vol. 17, No. 5, pp. 236-242 (Aug. 11-13, 1987).

ISDN Tutorial: Definitions, http://www.ralphb.net/ISDN/defs.html (Apr. 21, 2000).

ISDN Tutorial: Interfaces, http://www.ralphb.net/ISDN/ifaces.html Apr. 21, 2000.

Telecommunications Buyers Guide and Directory, Editor & Publisher, pp. 29TC-38TC, Feb. 1994.

"Aspect Telecom: Aspect Integrates the Web Into the Call Center", M2 Presswire, Aug. 1996.

"Information, Bid and Asked", Forbes, Aug. 20, 1990, p. 92.

John Robinson, "Attachmate Ready to Answer Net Questions", Network World, Apr. 8, 1996, p. 37.

Edith Herman, "US Courts to Launch First Federal 900 Service", Federal Computer Week, Sep. 28, 1992, p. 8.

Barbara Jarvie, "Company Devoted to Hot-Line Support", Computer Reseller News, Oct. 21, 1991, p. 48.

"For Telesphere's Clients, Dial '1-900 TUF LUCK'", Business Week, Sep. 9, 1991, p. 88.

"When Business Plan and Real World Clash", Wall Street Journal, Jun. 9, 1999, p. B1.

Christina Wood, "Hidden Cost of Tech Support", PC World, May 1995, pp. 143-152 & p. 156.

J. Sairamesh, et al., "NetBazaar: Networked Electronic Markets for Trading Computation and Information Services", Research and Advanced Technology for Digital Libraries, Second European Conference, ECDL 1998, pp. 839-856 (Sep. 21-23, 1998).

William H. Chimiak, et al., "Multimedia Collaborative Remote Consultation Tools Via Gigabit WAN in Teleradiology", IEEE 1994, Phoenix, p. 417. (7 pgs.).

J.W.R. Griffiths, et al., "Multimedia Communication in a Medical Environment", IEEE 1991 Singapore I.C. On Networks, p. 166. (8 pgs.).

PCT Search Report for PCT Application No. PCT/US01/48284, filed Oct. 30, 2002 (corresponding to U.S. Appl. No. 09/702,217) mailed May 13, 2002. (7 pgs.).

U.S. Appl. No. 09/596,466, filed Jun. 19, 2000, Agdeppa, Hector A.

U.S. Appl. No. 60/198,642, filed Apr. 20, 2000, Rothschild et al.

U.S. Appl. No. 60/471,535, filed May 19, 2003, Melideo.

Big Green Blog: Jan. 2005 Archives, Feb. 21, 2006.

Caring for Customers: Real-Time text chat and telephony provide personalized customer support and turn queries into sales leads, Internet World Media, Sep. 1999.

Information about Expertcity.com retrieved from the Internet [URL:http://www.expertcity.com] on Apr. 9, 2000.

Ingenio Press Archives for 2004, www.ingenio.com, Feb. 21, 2006.

"Introducing 1-800-FREE411: First Nationwide Free Telephone Directory Assistance Service" Jingle Networks, Inc., Huntington Beach, Calif., Sep. 20, 2005.

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners, Others", Agoura Hills, Calif., Oct. 17, 2005.

"Welcome to Jambo—the leader in Pay-perCall Solutions" (search results) Oct. 17, 2005.

ISA/US, International Search Report for International Application No. PCT/US05/12061, 3 pages, Nov. 17, 2006.

International Application No. PCT/US04/15238, Written Opinion and International Search Report, Aug. 29, 2005.

International Application No. PCT/US05/08379, Written Opinion and International Search Report, Nov. 17, 2006.

USPTO Transaction History of U.S. Appl. No. 10/679,982, filed Oct. 6, 2003, entitled "Method and Apparatus to Provide Pay-Per-Call Performance Based Advertising," now U.S. Patent No. 7,120,235.

USPTO Transaction History of U.S. Appl. No. 10/956,571, filed Oct. 1, 2004, entitled "Method and System to Connect Consumers to Information."

USPTO Transaction History of U.S. Appl. No. 10/956,771, filed Oct. 1, 2004, entitled "Method and System to Connect Consumers to Information," now U.S. Patent No. 7,224,781.

USPTO Transaction History of U.S. Appl. No. 11/021,939, filed Dec. 23, 2004, entitled "Method and Apparatus to Compensate Demand Partners in a Pay-Per-Call Performance Based Advertising System."

USPTO Transaction History of U.S. Appl. No. 11/508,015, filed Aug. 21, 2006, entitled "Method and Apparatus to Provide Pay-Per-Call Performance Based Advertising."

USPTO Transaction History of U.S. Appl. No. 11/624,613, filed Jan. 18, 2007, entitled "Method and Apparatuses for Pay for Deal Advertisements."

\* cited by examiner

_US 8,024,224 B2_

METHOD AND APPARATUS TO PROVIDE PAY-PER-CALL ADVERTISING AND BILLING

This application claims priority to provisional patent application No. 60/552,124 filed Mar. 10, 2004 titled "A Method and Apparatus To Provide Pay-Per-Call Advertising and Billing" and is incorporated herein by reference.

FIELD OF THE INVENTION

This invention relates to advertising. In particular, the invention relates to pay-per-call advertising and billing for the same.

BACKGROUND OF THE INVENTION

Performance based advertising refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Generally, advertisements may be as simple as a listing returned by a search performed on an on-line directory service. For example, a search conducted on Yahoo!'s Local Yellow Page site for "take-out Italian restaurants" may return a laundry list of results. However, it is difficult to determine whether calls made by a user to a merchant were actually made because of the advertisement returned by the search.

In one sense, the problem lies in today's pay-per-click standard. It works fine for e-businesses who have web sites, but for the millions of businesses who don't—local plumbers, roofers, florists—clicks don't mean anything. These advertisers need to see a correlation between what they're paying for and what they're getting. Clicks don't show that correlation—a report at the end of the month showing that you got 20 clicks doesn't show value to a local plumber. A phone call, however, does demonstrate value to the advertiser—he can hear when the phone rings and evaluate the revenues that phone call generated versus the amount he spent on the advertising. Therefore, there is a clear need to change the existing model.

SUMMARY OF THE INVENTION

A method and apparatus to provide pay-per-call performance based advertising and billing is disclosed. In one embodiment, a method, comprises generating a web page listing a plurality of merchant entries; and providing a option to reveal at least a portion of a phone number of at least one merchant entry of the plurality of merchant entries.

An example of one embodiment, as follows, illustrates the objects and benefits on the present invention. Burt is a plumber in Chicago who services his local area. He doesn't have a web site, but has a phone number—1-800-CALL-BURT—to attract clients.

He tried to use Internet search engines to drive more clients to his business. Search-engine advertising, however, required him to pay for clicks to a website, which he didn't have. He set up a simple web page to direct these clicks toward his business, and spent $100 on a search engine advertisement. But at the end of the month, he still didn't know whether the advertising had significantly helped his business. His monthly report showed him that he received 25 clicks to his web page. Who were these people? How many of them called him? Was it worth the $100 he spent? He had no idea.

Enter the new phone-number-based click-to-reveal advertiser system. Now Burt advertises with this new system. He enters his simple name and address as well as his phone number—1-800-CALL-BURT. When customers want to call him, they click to reveal his phone number, and the system tallies how many customers have done s.

Now, at the end of the month, Burt learns that 14 people clicked to reveal his phone number. He can be quite certain that most all of these 14 people called him in the past month. He knows that he did significant business with several of them, and so the $100 he spent on click-to-reveal advertising was well spent.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION OF THE INVENTION

A method and apparatus to provide pay-per-call performance based advertising and billing is disclosed. A method, comprises generating a web page listing a plurality of merchant entries; and providing a option to reveal a phone number of at least one merchant entry of the plurality of merchant entries.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to documentary data. However, the same techniques can easily be applied to other types of data such as voice and video.

Figure 1:
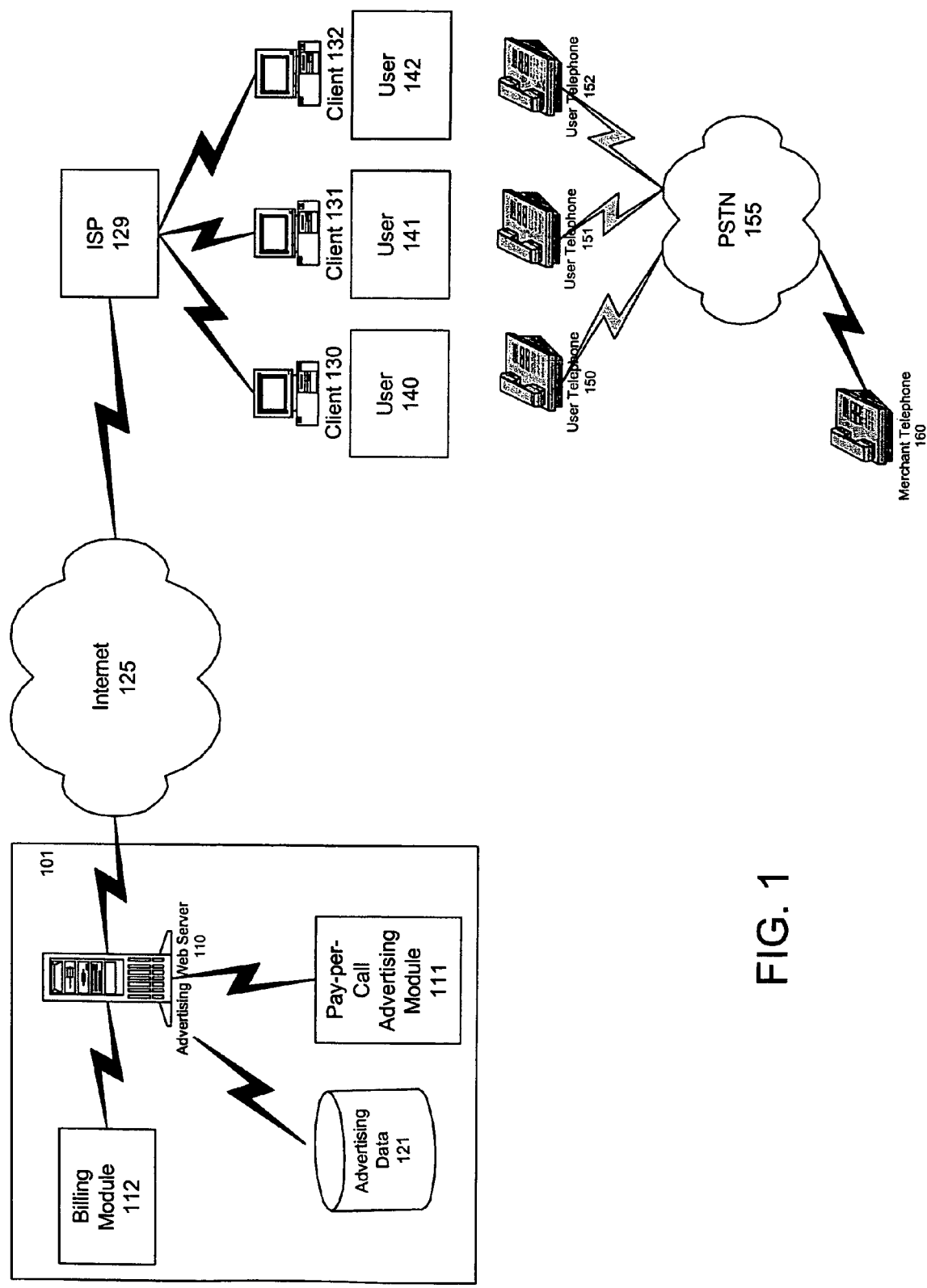
FIG. 1 illustrates an exemplary network architecture for pay-per-call advertising and billing used to implement elements of the invention.

Elements of the present invention may be included within a client-server based system 100 such as that illustrated in FIG. 1. According to the embodiment depicted in FIG. 1, one or more servers 110 communicate to a plurality of clients 130-132. The clients 130-132 may transmit and receive data from server 110 over a variety of communication media including (but not limited to) a wide area network 125 (e.g., the Internet) via an Internet service provider (ISP) 129. Alternative communication channels such as wireless communication via satellite broadcast (not shown) are also contemplated within the scope of the present invention.

A user/client may interact with and receive feedback from server 110 using various different communication devices and/or protocols. According to one embodiment, a user connects to server 110 via client software. The client software may include a browser application such as Netscape Navigator™ or Microsoft Internet Explorer™ on the user's personal computer, which communicates to electronic commerce server 110 via the Hypertext Transfer Protocol (hereinafter "HTTP"). In other embodiments included within the scope of the invention, clients may communicate with server 110 via cellular phones and pagers (e.g., in which the necessary transaction software is electronic in a microchip), handheld computing devices, and/or touch-tone telephones.

In one embodiment, server 110 is part of a pay-per-call performance based advertising and billing system 101. Advertising system 101 includes a pay-per-call advertising module 111, that renders advertisements for merchants 160. The advertisements take the form of an entry among a list of entries returned by an on-line search. Billing module 112 works with pay-per-call advertising module 111 to properly bill merchant 160, based on the number of users that call merchant 160 from the search results served by server 110. Also included in system 100, are user telephones 150-152, which users 140-142 utilize to contact merchant 160 over public switched telephone network (PSTN) 155. Although, only one merchant 160 is illustrated, many merchants may also be included in system 100.

In one embodiment, server 110 may include a database such as advertising database 121 for storing various types of data. This may include, for example, specific merchant data (e.g., advertisement information, merchant account information and merchant preferences) and/or more general data. The database on electronic commerce servers 110 in one embodiment runs an instance of a Relational Database Management System (RDBMS), such as Microsoft™ SQL-Server, Oracle™ or the like.

Figure 2A:
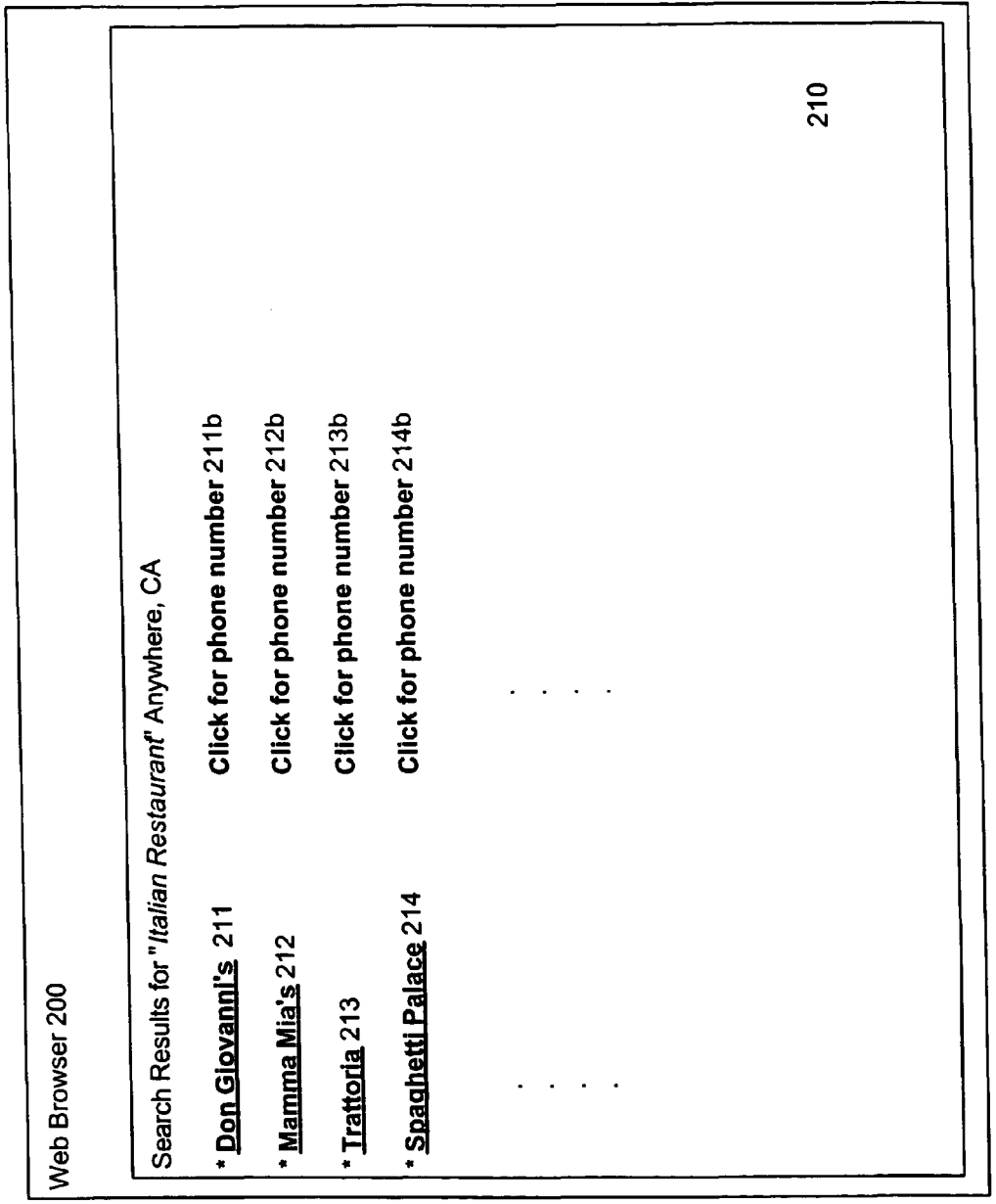
FIG. 2_a-b_ illustrate an exemplary graphical user interface (GUI) providing pay-per-call advertising, according to one embodiment of the present invention.

FIG. 2a illustrates an exemplary graphical user interface (GUI) providing pay-per-call advertising, according to one embodiment of the present invention. GUI 200 takes the form of a web browser display 200 seen by clients 130-132. GUI 200 renders a web page 210 that lists the results of a search. Results page 210 is rendered when a user 140-142 provides a search term, such as "Italian Restaurant" to an on-line directory service. Search results include entries 211-214, such as Don Giovanni's, Mamma Mia's, Trattoria, and Spaghetti Palace. Each of the entries 211-214 may be ordered alphabetically; or based on advertising rates (i.e., where Don Giovanni's pays more than other merchants to be listed first). The entries 211-214 may also be listed in an order determined by a bidding system among the merchants, wherein the merchants bid to obtain placement in the search results. Alternatively, the entries 211-214 could be listed based on popularity, distance, etc.

In one embodiment, one or more of the merchant entries listed, include an option in the form of a hyperlink, option, a button, or graphical element 211b-214b to reveal a telephone number for the corresponding merchant, or a remaining portion of the telephone number.

Figure 2B:
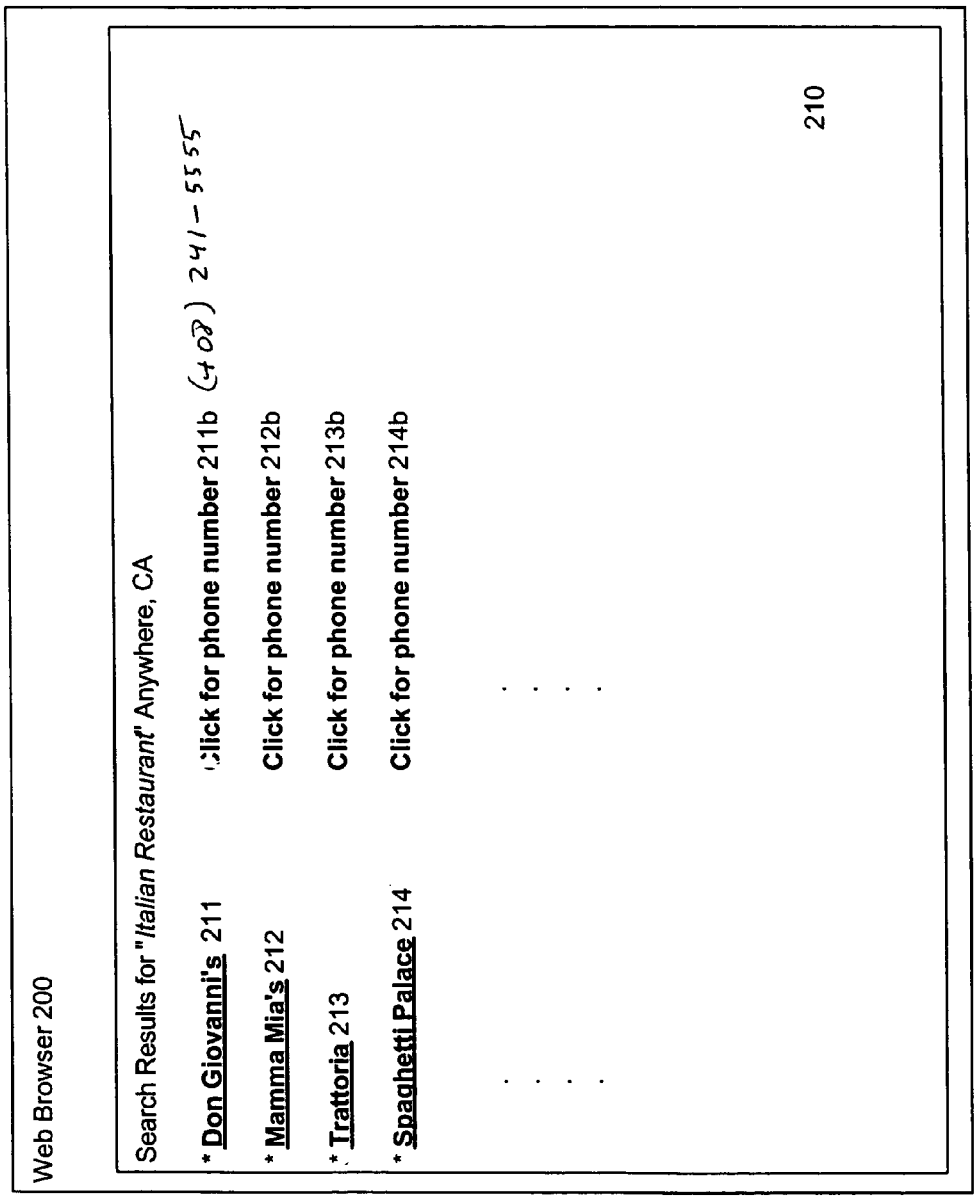

For example, as shown in FIG. 2b, the button 211b corresponding to Don Giovanni's was selected and the corresponding telephone number has been revealed. Once a user 140-142 has clicked on the option 211b-214b, (i.e., click-to-reveal) there is a greater certainty that the user 140-142 will use that information to provide merchant 160 with a business opportunity.

As described herein, "hyperlink" includes page-linking and graphical transformations. For example, in one embodiment, when a user clicks to reveal the telephone number of a merchant, the phone number revealed in response is not necessarily shown on a separate web page. Rather, in one embodiment, DHTML functionality may be used to keep the current web page on screen but just remove an obscured section to reveal the telephone number, or the remainder of the number. From an end-user perspective there would be no refresh of the web browser. The click-to-reveal action may keep the entire current web page being viewed intact, but just remove whatever was obscuring the phone number. In one embodiment, the obscuring agent could be a text link, button, or graphical element.

In one embodiment, the click-to-reveal is used for billing a merchant 160 on a pay-per-call basis, since a user 140-142 will generally click on the phone number option, only if user 140-142 intends to call merchant 160. Thus, billing module 112 can monitor the number of clicks made to a phone number option 211b-214b and bill the merchants accordingly. According to one embodiment, an alias phone number (such as an "800" number) may be used. The alias phone number is revealed by clicking a phone number option 211b-214b. Calls made to the alias phone number (including repeat calls) may be billed to the respective merchants.

Figure 3:
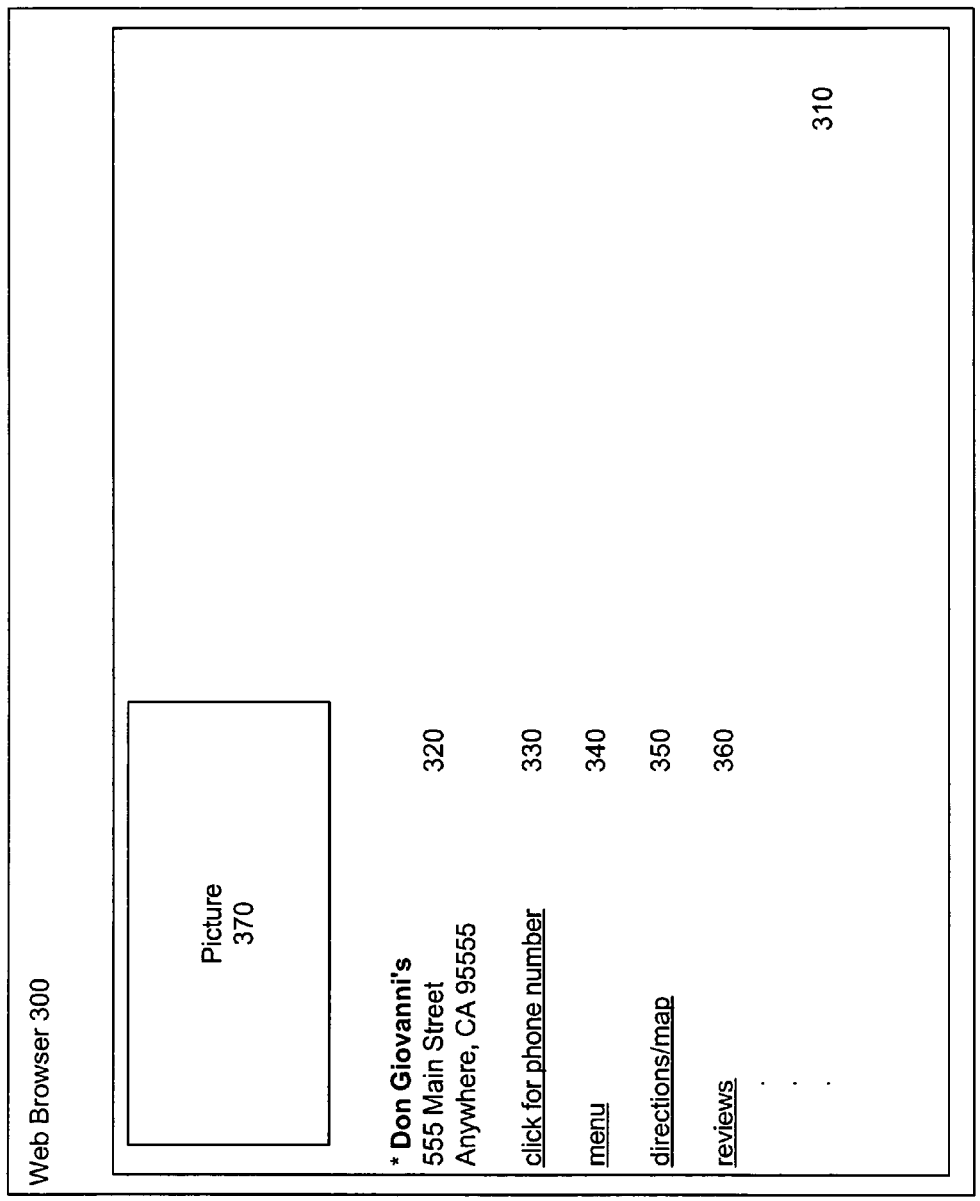
FIG. 3 illustrates an exemplary graphical user interface (GUI) providing details of a pay-per-call advertisement, according to one embodiment of the present invention.

In an alternate embodiment, the merchant listings as shown in FIG. 2a, may provide links to a separate page for one or more of the merchants. The separate web page(s), may provide additional information on the respective merchant, including an option to reveal either a portion or the entire telephone number of the merchant. For example, FIG. 3 illustrates an exemplary graphical user interface (GUI) providing additional details of merchant. As illustrated, web browser display 300 renders a details web page 310. According to one embodiment, the merchant's name and address 320 are listed. In the example of restaurant merchants, additional options may be provided for the menu 340, directions or map 350, reviews 360, and a phone number option 330. Additional options may be provided, depending upon the type of merchant listed, for example a listing for a movie theater may have a option to "movie times." Alternate naming conventions may also be provided, for example, the telephone number option 330, may be renamed "click to make reservations."

In an alternate embodiment, billing module 112, in connection with PSTN 155, monitors the time interval between a click-to-reveal action and an actual phone call to the merchant 160. In this embodiment, if an actual phone call results from a click-to-reveal action within a predetermined period of time (e.g., few seconds), then there is certainty that the merchant received the call because of the web-based advertisement, and the merchant is charged accordingly.

In another embodiment, telephone prompts are provided to the merchant 160 to inform the merchant that the incoming phone call resulted from a "click-to-reveal" action. For example, if a user 140-142 "clicks-to-reveal" Don Giovanni's phone number and dials the revealed phone number, when Don Giovanni's answers the users call, a prompt may state "This lead is brought to you by XYZ advertisement system."

In an additional embodiment, advertising system 101 may implement automatic number identification (ANI) to provide follow-up opportunities to merchant 160. Additionally, system 101 administrators can follow-up with users 140-142 to obtain information regarding their experience, using ANI. Another embodiment, allows ANI to identify a general location from where the call originated and match it with an IP address of the computer requesting the "click-to-reveal" phone number. An IP address can be used to identify a general location of a user 140-142, as well.

In alternate embodiments, a portion of the desired phone number is displayed on a web page. In that embodiment, clicking the phone number option would reveal the remainder of the phone number. In other embodiments, where the performance criteria are not pay-per-call, similar options may be used and monitored. This may include pay-per-map (i.e., merchant 160 pays every time a user looks-up directions), pay-per-review (i.e., reviewers are paid whenever their review is read), or similar metric.

Figure 4:
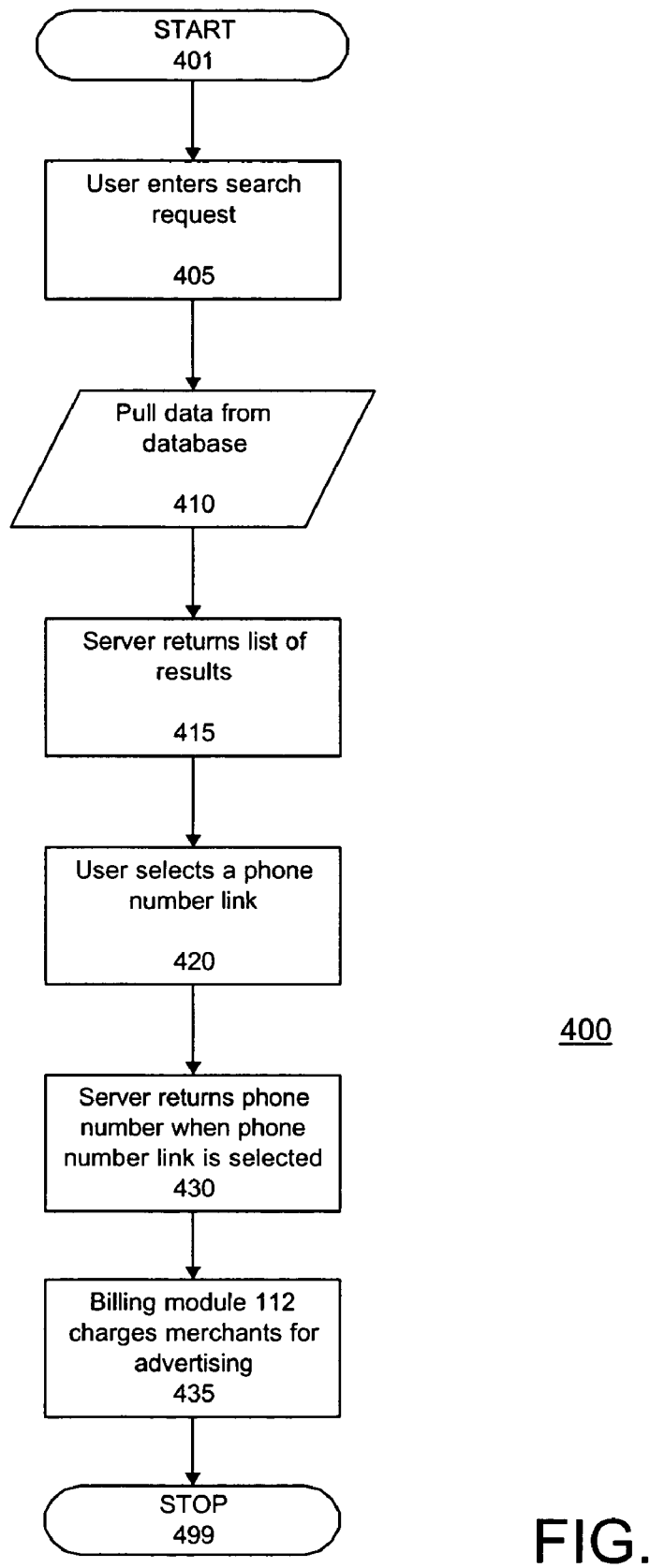
FIG. 4 illustrates an exemplary flowchart of operations performed in accordance with one embodiment of the present invention.

FIG. 4 illustrates an exemplary flowchart of operations performed in accordance with one embodiment of the present invention. A pay-per-call advertising and billing process 400 commences (Block 401) when a user 140-142 enters a search request (Block 405). Server 110 pulls entries from database 121 (Block 410). Using advertising module 111, server 110 returns a list of the entries 210 as a search result. (Block 415)

In one embodiment where one or more phone number options 211b-214b are listed for the merchants in the search results, a user 140-142 selects a phone number option to reveal a merchant's telephone number, or at least a remaining portion of the telephone number (Block 420). In response, server 110 provides the desired phone number (Block 430). Billing module 112 records the transaction and bills merchant 160 appropriately (Block 435) and the process ends (Block 499).

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A computer implemented method, comprising:
generating, via a computing device, a first web page listing a plurality of merchant entries; and
providing, via the computing device, the first web page to a browser of a user, wherein when initially displayed in the browser, the first web page displays a first portion of a phone number and provides an option to display a second portion of the phone number that is initially partially displayed in the web page, the phone number corresponding to one merchant entry of the plurality of merchant entries, and the second portion of the phone number is not displayed in the first web page until the option is selected, the option prompting the user to select the option for a purpose of viewing the phone number in entirety;
wherein the second portion of the phone number is displayed on the first web page without refresh of the web browser after the option is selected by the user.

2. The method of claim 1, further comprising billing a merchant for each instance the option is selected.

3. The method of claim 2, wherein billing a merchant further comprises charging the merchant based on a number of phone calls made to the merchant through selection of the option.

4. The method of claim 1, wherein the method further comprises providing a telephone prompt to the merchant to inform the merchant that an incoming phone call resulted from display of the second portion of the phone number on the first web page.

5. The method of claim 4, wherein the method further comprises providing an automatic number identification for the user to the merchant.

6. A system, comprising:
a database to store advertising data; and
a computing device coupled to the database to:
generate a web page listing a plurality of merchant entries; and
provide the web page to a browser of a user, wherein when initially displayed in the browser, the web page displays a first portion of a phone number and provides an option to display a second portion of the phone number that is initially partially displayed in the web page, the phone number corresponding to one merchant entry of the plurality of merchant entries, and the second portion of the phone number is not displayed in the web page until the option is selected, the option prompting the user to select the option for a purpose of viewing the phone number in entirety;
wherein the second portion of the phone number is displayed on the first web page without refresh of the web browser after the option is selected by the user.

7. The system of claim 6, further comprising billing a merchant for each instance the option is selected.

8. The system of claim 7, wherein billing a merchant further comprises charging the merchant based on a number of phone calls made to the merchant through selection of the option.

9. The system of claim 6, wherein the method further comprises providing a telephone prompt to the merchant to inform the merchant that an incoming phone call resulted from display of the second portion of the phone number on the first web page.

10. The system of claim 9, wherein the method further comprises providing an automatic number identification for the user to the merchant.

11. A non-transitory tangible machine-readable medium, having stored thereon a sequence of instructions, which when executed by a computer, cause the computer to perform a method comprising:
generating a web page listing a plurality of merchant entries; and
providing the first web page to a browser of a user, wherein when initially displayed in the browser, the first web page displays a first portion of a phone number and provides an option to display a second portion of the phone number that is initially partially displayed in the web page, the phone number corresponding to one merchant entry of the plurality of merchant entries, and the second portion of the phone number is not displayed in the first web page until the option is selected, the option prompting the user to select the option for a purpose of viewing the phone number in entirety;
wherein the second portion of the phone number is displayed on the first web page without refresh of the web browser after the option is selected by the user.

12. The machine-readable medium of claim 11, wherein the method further comprises billing a merchant for each instance the option is selected.

13. The machine-readable medium of claim 12, wherein the method further comprises charging the merchant based on a number of phone calls made to the merchant through selection of the option.

14. The machine-readable medium of claim 11, wherein the method further comprises providing a telephone prompt to the merchant to inform the merchant that an incoming phone call resulted from display of the second portion of the phone number on the first web page.

15. The machine-readable medium of claim 14, wherein the method further comprises providing an automatic number identification for the user to the merchant.

16. A system, comprising:
- a processor;
- a network interface coupled to the processor; and
- a tangible machine-readable medium having stored thereon a set of instructions which when executed by the processor cause the processor to perform a method comprising:
  - generating a web page listing one merchant entry; and
  - providing the web page to a browser of a user, wherein when initially displayed in the browser, the web page displays a first portion of a phone number and provides an option to display a second portion of the phone number that is initially partially displayed in the web page, the phone number corresponding to the merchant entry, and the second portion of the phone number is not displayed in the web page until the option is selected, the option prompting the user to select the option for a purpose of viewing the phone number in entirety;
  - wherein the second portion of the phone number is displayed on the first web page without refresh of the web browser after the option is selected by the user.

17. The system of claim 16, wherein the method further comprises billing a merchant for each instance the option is selected.

18. The system of claim 17, wherein the method further comprises charging the merchant based on a number of phone calls made to the merchant through selection of the option.

19. The system of claim 16, wherein the method further comprises providing a telephone prompt to the merchant to inform the merchant that an incoming phone call resulted from display of the second portion of the phone number on the first web page.

20. The system of claim 19, wherein the method further comprises providing an automatic number identification for the user to the merchant.

* * * * *